United States Patent [19]

Von

[11] 4,217,273
[45] Aug. 12, 1980

[54] PROCESS FOR AZO PIGMENTS

[75] Inventor: Isaiah Von, New Brunswick, N.J.

[73] Assignee: American Cyanamid Company, Stamford, Conn.

[21] Appl. No.: 1,567

[22] Filed: Jan. 5, 1979

[51] Int. Cl.² ............................................. C09B 29/04
[52] U.S. Cl. ................................................... 260/202
[58] Field of Search ......................................... 260/202

[56] References Cited
U.S. PATENT DOCUMENTS 3,520,870  7/1970  Dombroski ...................... 260/202 X Primary Examiner—Paul F. Shaver
Attorney, Agent, or Firm—Bruce F. Jacobs

[57] ABSTRACT

A pigment modifier composition for azo pigments is prepared in situ by chlorination of 2-hydroxy-3-naphthoic acid with a hypochlorite such that up to 10% of the acid is converted into 1-chloro-2-hydroxy-3-naphthoic acid.

2 Claims, No Drawings

PROCESS FOR AZO PIGMENTS

The invention relates to the preparation of azo pigments based on the diazotization of various aromatic amino sulfonic acids and coupling thereof into 2-hydroxy-3-naphthoic acid (BON). More particularly, it relates to a process for the preparation of improved azo pigments containing a modifier composition and to the preparation of the modifier composition in situ.

Azo pigments based on the use of 2-hydroxy-3-naphthoic acid as a coupling component are well-known. Examples of azo pigments of the type are Pigment Red 48 (Color Index No. 15865), Pigment Red 52 (C.I. No. 15860), Pigment Red 57 (C.I. No. 15850), Pigment Red 58 (C.I. No. 15825), and Pigment Red 63 (C.I. No. 15880). They are based on coupling of 2-hydroxy-3-naphthoic acid with the diazo of 6-amino-4-chloro-m-toluenesulfonic acid, 2-amino-5-chloro-p-toluenesulfonic acid, 6-amino-m-toluenesulfonic acid, 3-amino-2-chlorobenzene sulfonic acid and 2-aminonaphthalene-1-sulfonic acid, respectively. Other analogs are similarly prepared from other aromatic amino sulfonic acids and 2-hydroxy-3-naphthoic acid (BON).

The use of a modifier composition to improve properties of the aforementioned azo pigments, comprising about 90 to 99 percent by weight of BON and about 1 to 10 percent by weight of an α-substituted 2-hydroxy-3-naphthoic acid as the coupling component, is described by Burley et al. in a co-filed, commonly assigned application, Ser. No. 001,566. Similarly, a process for the preparation of one of the preferred modifier compounds, 1-chloro-2-hydroxy-3-naphthoic acid (CIBON), is described by Miller in a co-filed, commonly assigned application, Ser. No. 001,568.

The present invention provides a process for the preparation of azo pigments, whereby a coupling component, comprising 90 to 99 percent by weight of BON and 1 to 10 percent by weight of CIBON, is prepared in situ.

Azo pigments of the present invention, as the calcium, barium, strontium, or manganese salts of the carboxylic acid, are prepared by conventional coupling procedures from the appropriate amino sulfonic acid and the 2-hydroxy-3-naphthoic acid coupling component using a molar ratio of amino sulfonic acid to coupling component of from about 1/1 to 1/1.2. The coupling component, in accordance with the invention, will comprise from about 90–99 percent by weight of 2-hydroxy-3-naphthoic acid and about 1–10 percent by weight of 1-chloro-2-hydroxy-3-naphthoic acid. A typical procedure for the preparation of an azo pigment, including various conditioning and end-treatment processes, is described in Dombroski, U.S. Pat. No. 3,520,870, which is incorporated herein by reference.

The coupling component of the invention, comprising 90–99 percent by weight of 2-hydroxy-3-naphthoic acid and 1–10 percent by weight of 1-chloro-2-hydroxy-3-naphthoic acid, is readily obtained by first dissolving sufficient 2-hydroxy-3-naphthoic acid in water, along with sufficient alkali to form an alkaline solution, to provide about 1 to 1.2 molar proportions of BON per molar proportion of aromatic amino sulfonic acid, i.e. up to about a 20 percent molar excess. Preferably sodium hydroxide is used. The amount of alkali used is sufficient to dissolve the 2-hydroxy-3-naphthoic acid and form the dialkali metal salt thereof, preferably the disodium salt.

Before the solution of the diazo of the amino sulfonic acid is added to the BON solution to complete the coupling reaction, the BON solution is contacted with an aqueous solution of alkali metal hypochlorite, in an amount sufficient to chlorinate the BON in the alpha position to provide 1-chloro-2-hydroxy-3-naphthoic acid (CIBON) and to provide a coupling component, in accordance with the invention, comprising 90–99 percent by weight of BON and 1–10 percent by weight of CIBON. Preferably sodium hypochlorite is used. The sodium hypochlorite is readily available as a 10–15 percent solution. Since the amount of coupling component used will always be at least stoichiometric with the amino sulfonic acid used to as high as a 20 percent excess of stoichiometry, the CIBON may be used in place of, or in addition to, the BON in the coupling reaction and the amount is readily controlled by the extent of the chlorination reaction. The chlorination reaction may be readily conducted at ambient temperatures.

The pigments may be obtained as the calcium, barium, strontium, or manganese salt of the acid and the pigments may be treated by various conditioning or end-treatment procedures which are well-known in the art, as described in the aforementioned U.S. Pat. No. 3,520,870.

The pigments of the invention are used in conventional printing ink compositions, including alcoholic and flexographic inks, ratogravure and nitrocotton shellac flexographic inks.

The invention is further illustrated by the following examples.

EXAMPLE 1

A solution of 24.2 grams (0.1294 mole) of pure 6-amino-m-toluenesulfonic acid and 1.2 grams (0.0054 mole) of 2-naphthylamine-1-sulfonic acid is prepared in 500 ml of water by adding 57 ml of a 10% solution of sodium hydroxide and adjusting the pH to 11.5. A solution of 35.6 grams of calcium chloride and 1.5 grams of strontium nitrate in 100 ml of water is added thereto and the mixture cooled to 0° C. with ice. The amines are diazotized by adding 35 ml (0.14 mole) of 4 N sodium nitrite, followed by 150 ml (0.411 mole) of 10% hydrochloric acid. The mixture is stirred for about 3 minutes at 0° C., while maintaining excess nitrous acid.

2-Hydroxy-3-naphthoic acid (28.0 grams, 0.1489 mole) is dissolved in 500 ml of water by adding 180 ml of 10% sodium hydroxide. 1-Chloro-2-hydroxy-3-naphthoic acid is formed in situ by adding 0.333 gram (0.0045 mole) of sodium hypochlorite as a 12–15% solution. To the solution is added a solution of 9 grams of modified tall oil in 500 ml of water containing 18 ml of 10% sodium hydroxide. The mixture is cooled to 0° C.–5° C.

The slurry of the diazonium salts is rapidly added to the solution of 2-hydroxy-3-naphthoic acid and the mixture is stirred at 5°–10° C. at a pH of 11.0–11.5 until coupling is complete.

The pigment suspension which results is heated at a rate of 1.5° C./minute to 90° C., held at 90° C. for 10 minutes, and then cooled to 80° C. The pigment is filtered, washed with 45°–50° C. water until free of salts, and dried at 80° C. to give 66.44 grams of product Pigment Red 57.

The ratio of moles of 2-hydroxy-3-naphthoic acid charged to moles of amine is 1.10/1. Of the 10% excess of 2-hydroxy-3-naphthoic acid, theoretical yield of 1- chloro-2-hydroxy-3-naphthoic acid is 3%. Actual by analysis is 3.2% by weight.

EXAMPLE 2

A solution of 15 grams (0.068 mole) of 2-amino-5-chloro-p-toluenesulfonic acid is prepared in 400 ml of water, containing 0.7 gram of Tamol N surfactant, by adding 31 ml of 10% sodium hydroxide (0.077 mole) and adjusting the pH to 11.8–12.2, if necessary.

A solution of 13.5 grams (0.072 mole) of 2-hydroxy-3-naphthoic acid is prepared in 600 ml of water by adding 72 ml of 10% sodium hydroxide (0.18 mole).

A solution of 5.4 grams of Rosin N (0.018 mole as abietic acid) in 100 ml of water is prepared by adding 12 ml of 10% sodium hydroxide (0.03 mole) and heating to the boil. This solution is added to the solution of 2-hydroxy-3-naphthoic acid and the volume adjusted to 1500 ml at 20° C. This solution comprises the coupling component.

Calcium chloride (19.5 grams, 0.133 mole) and 1 gram (0.006 mole) of strontium nitrate are dissolved in 100 ml of water and the pH adjusted to 6.0–6.5 with 10% hydrochloric acid.

The amine solution, prepared above, is cooled to 0° C. with excess ice, 66 ml of 10% hydrochloric acid is added and the solution is stirred for 10 minutes. To this is added 18 ml of 4 N sodium nitrite solution and the mixture is stirred for 30 minutes at 0° C., or lower. Then, the salt solution, prepared above, is added and the solution is stirred for about 2 minutes. This comprises the diazo component.

The diazo solution is rapidly added to the solution of coupling component and stirred for 10 minutes. The pH is adjusted to 10–11, the temperature is adjusted to 20° C., and the mixture is stirred for 2 hours. The pH is then adjusted to 8.5–9.5 with acetic acid and heated at about 1.5° C./minute to 100° C. and held for one hour. The mixture is then cooled to 75°–80° C. with ice and 1 gram of 27% aluminum chloride solution is added, stirred for 5 minutes, and the pH adjusted to 6.6–7.2. The mixture is stirred for 30 minutes, cooled to 70° C. and the product is filtered, washed with 4 liters of hot (45°–50° C.) water, and dried at 80° C.

EXAMPLES 3–5

Example 2 was repeated in every detail except that part of the 2-hydroxy-3-naphthoic acid in the solution thereof was reacted with sodium hypochlorite before addition of the Rosin N solution. Example 3 contained 1% (0.0007 mole), Example 4 contained 2% (0.0014 mole) and Example 5 contained 4% (0.0028 mole) of 10% sodium hypochlorite solution to form, in each case, 1-chloro-2-hydroxy-3-naphthoic acid in situ. The ratio of amino sulfonic acid/coupling component in Examples 2–5 is 1/1.07 (0.0727/0.068 moles).

The pigments of Examples 3–5 were compared with the pigment of Example 2 in mass tone, tint, and strength with the following results:

| Pigment of Example | Mass Tone* vs. Control | Tint* vs. Control | Strength, % vs. Control |
| --- | --- | --- | --- |
| 3 | mod. dk. | mod. bl. | 101 |
| 4 | con.-mu. dk. | mod.-con. bl. | 102 |

-continued

| Pigment of Example | Mass Tone* vs. Control | Tint* vs. Control | Strength, % vs. Control |
| --- | --- | --- | --- |
| 5 | v. mu. dk. | mod. bl. | 101 |

*bl = bluer
con = considerably
dk = darker
mod = moderately
mu = much
v = very

The results show that, compared to the control (Example 2), pigments containing 1–4%, 1-chloro-2-hydroxy-3-naphthoic acid, prepared in situ, are about equal in strength, but moderately to very much darker in mass tone, and moderately to considerably bluer in tint.

EXAMPLE 6

A solution of 30 grams (0.135 mole) of 6-amino-4-chloro-m-toluenesulfonic acid in 500 ml of water is prepared at 30°–35° C. by adding 8.2 grams (0.135 mole) of 28% aqueous ammonia. The pH is adjusted to 8.2–8.6 by adding either additional sulfonic acid or aqueous ammonia, if necessary.

A solution of 29.3 grams (0.156 mole) of 2-hydroxy-3-naphthoic acid in 800 ml. of water is prepared by adding 120 ml of 10% sodium hydroxide solution (0.30 mole). Soda ash (3.0 grams, 0.028 mole) is added and then 0.56 gram (real) of sodium hypochlorite solution (0.0075 mole) is added and the reaction mixture is stirred for about one hour.

A solution of 3.0 grams of Actinol SM-4 Rosin is made in 120 ml of water by adding 6 ml of 10% sodium hydroxide solution (0.015 mole) and heating to the boil.

A solution of 35.6 grams (0.24 mole) of calcium chloride and 1.5 grams (0.007 mole) of strontium nitrate in 100 ml of water is adjusted to pH 6.0–6.5 with 10% hydrochloric acid solution.

The solution of Actinol SM-4 is added to the solution of 2-hydroxy-3-naphthoic acid and the temperature adjusted to 0° C.

The solution of 6-amino-4-chloro-m-toluenesulfonic acid is cooled with ice to 10° C., 160 ml of 10% hydrochloric acid is added (0.44 mole), and the solution stirred for about 2 minutes. Sodium nitrite (35 ml of 4 N solution=0.14 mole) is added and the mixture stirred for 30 minutes. The solution of calcium chloride and strontium nitrate is added, stirred for 2 minutes, and the resulting diazo solution is added as rapidly as possible to the solution of 2-hydroxy-3-naphthoic acid and rosin. The reaction mixture is stirred for 15 minutes and the pH adjusted to 4.0–5.0 at 5°–10° C.

A solution of 31 ml of 10% sodium hydroxide in 72 ml of water is slowly added to the reaction mixture over a period of about 90 minutes to a pH of 6.8–7.0. The solution is heated at 1.5° C./minute to the boil, held at the boil for about one hour and then cooled to 75°–80° C. The mixture is filtered, washed with 6 liters of hot (40°–50° C.) water and dried at 80° C.

The pigment is compared with a similar pigment prepared in the same manner except that no sodium hypochlorite is added.

The pigment of Example 6 is considerably darker in mass tone, a trace bluer in tint, and about equal in strength to the control.

What is claimed is:

1. In a process for the preparation of an azo pigment whereby a diazo of an aromatic amino sulfonic acid is coupled into 2-hydroxy-3-naphthoic acid and whereby said pigment is optionally converted into the alkali metal, alkaline earth metal, or manganese salt thereof, the improvement which comprises: (1) forming an aqueous alkaline solution of 2-hydroxy-3-naphthoic acid, containing up to about a 20 percent molar excess over that amount stoichiometrically required to couple with said diazo com-(2) adding to said solution an amount of alkali metal hypochlorite to produce in situ 1-chloro-2-hydroxy-3-naphthoic acid, such that the amount thereof comprises from about 1 to 10 percent by weight, based on the total weight of 2-hydroxy-3-naphthoic acid and 1-chloro-2-hydroxy-3-naphthoic acid; and (3) adding thereto an aqueous solution of said diazo compound.

2. The process of claim 1 wherein the hypochlorite is sodium hypochlorite.

* * * * *